Figure 2:
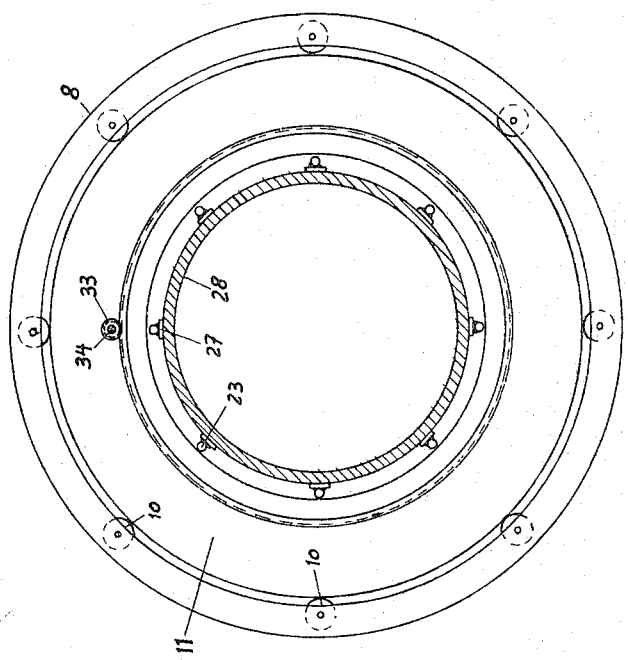

Dec. 6, 1966   P. MORSBACH ETAL   3,289,506
CUTTING-OFF MACHINE FOR TRANSVERSE CUTTING OF TUBES
Filed May 18, 1964

Inventors
Paul Morsbach
Klaus Leben

By

Semmes & Semmes   Attorneys 3,289,506
CUTTING-OFF MACHINE FOR TRANSVERSE
CUTTING OF TUBES
Paul Morsbach, Bahnhofstr. 3, Angermund, Germany, and
Klaus Leben, Hirschstr. 19, Oberhausen-Sterkrade,
Germany
Filed May 18, 1964, Ser. No. 368,251
Claims priority, application Germany, May 18, 1963,
J 23,735
3 Claims. (Cl. 82—53.1)

The invention relates to a cutting-off machine adapted for transverse cutting of tubes during the rotation of the tubes and during the axial movement, comprising a frame encircling the tube and moving with it in the same direction. This frame is also equipped with the cutting tool. In the operation of machines of this type it is necessary that after having cut-off the tube same should remain in its relative position in relation to the end of the tube so as to avoid any damages to the cutting tool and, if necessary, to retract same just before the cut-off portion of the tube might be able to start a motion of its own. Especially in those cases when simultaneously with the cutting operation welding edges at the tube ends must be prepared, an exact centering and unchangeable relative position is required so as to avoid any damages to the welding edge after the cutting operation.

The solution of this problem according to the invention comprises a frame movably arranged in axial direction of the tube by means of rollers running on rails. Furthermore, the frame is equipped with two roller beds having a rectangular position in relation to the tube axis and carrying circular plates which by means of pistons and piston rods actuated by hydraulic pressure cylinders radially arranged and fastened to the plates are intended for pressing claws on the tube on both sides of the intended cutting line.

The two plates can be connected together rigidly, however, there is also a mechanical connection or coupling possible in furnishing the plates with the same toothed wheel rim being in action with corresponding pinion gears arranged on the same shaft driven by a motor. The rotation of the motor must be adjusted according to the number of revolutions of the tube.

Since machines of this type are intended for the production of spiral tubes of various diameters the frame must be adapted to be lowered or to be raised with regard to the feature that not the level of the tube axis but the level of the lower limiting line must be maintained. This can be accomplished in such a manner that the frame is arranged on a travelling carriage running parallel to the axis by means of inclined supports. The lower ends of these inclined supports are connected to nuts having screw threads for running in opposite directions on sliding-ways and which nuts can be actuated by means of a spindle driven by a motor. However, more advantageous is a measure whereby the rails of the carriage are fastened to supports which in relation to their level can be adjusted either hydraulically or by means of screw spindles.

The frame carries also the cutting tool support which may be adjustably arranged in parallel direction to the axis and equipped with an individual drive for the tool (for example roller shears, side milling cutter, or circular saw) such as with tools for the preparation of the welding edges, if required.

Figure 1:
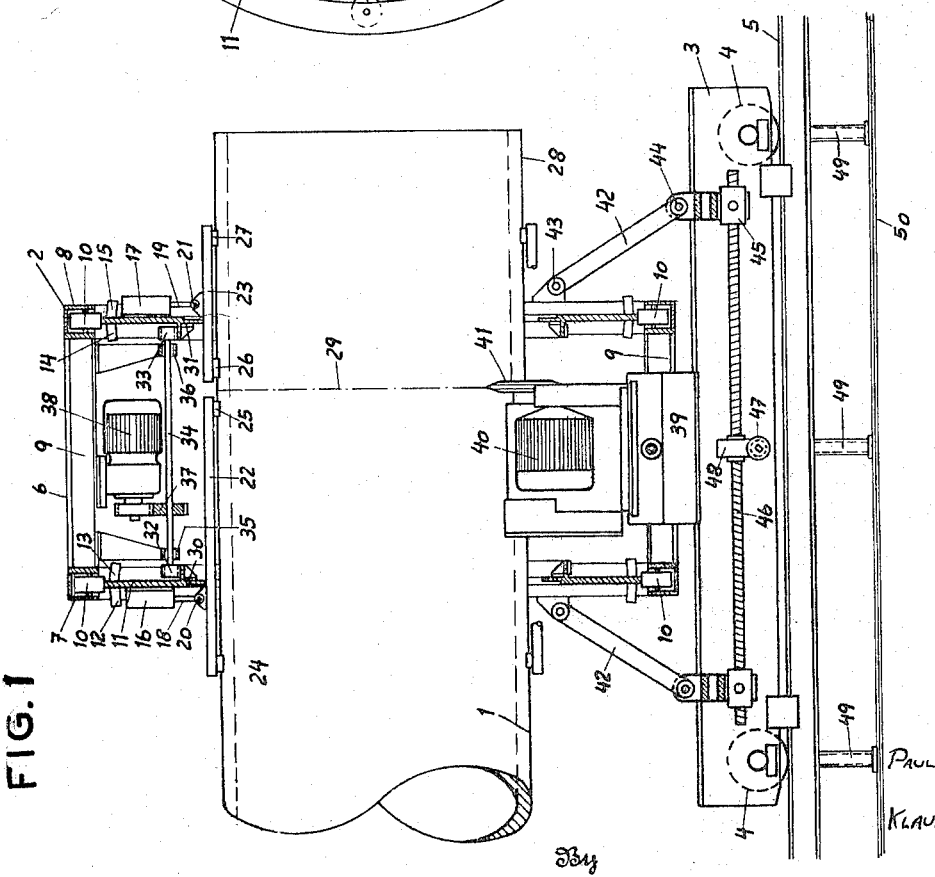

An example embodying the essential features of the invention is shown in the drawings wherein FIG. 1 represents a vertical cross-section along the tube axis, FIG. 2 represents a vertical cross-section taken rectangularly to the tube axis.

With reference to the drawing the tube 1 is concentrically seized by the cutting-off machine 2 comprising a carriage 3 running on rails 5 by means of rollers 4. The rails 5 are parallel to the tube axis. This carriage carries the frame 6 consisting essentially of two U-shaped bent rings 7 and 8 being open on their inner side. The center planes of these rings are rectangular to the tube axis. Both rings are connected by cross bars 9 thus embodying a rigid frame 6 which can be rigidly connected to the carriage 3. In the drawing is shown an embodiment of the invention according to which the frame 6 is arranged concentrically in relation to the tube by means of devices which will be described later.

In the rings 7 and 8 there are rollers 10 pivotally arranged the axis of which represent the generating curves of a regular cylinder. These rollers support circular plates 11, 11' which are held in their rectangular position in relation to the tube axis by means of guide rollers 12, 13, 14, and 15 which are attached to the rings 7 and 8. To the plates 11 and 11' in radial direction there are fastened hydraulical cylinders 16, 17, the pistons or piston rods (18, 19) of which carry by means of pivotally arranged connections 20, 21, the rod type holding devices 22, 23 pressing the claws 24, 25, or 26, 27, respectively, to the tube 1.

The measures described alone would be sufficient to hold the tube 1 and the tube portion 28 after the cutting operation in an isoaxle position and rotation considering, however, that the torque must be taken over by the frame 2. For its relief it can be used itself for the drive. For this purpose each of the circular plates 11, 12, is equipped with the same toothed wheel rim 30, 31, being in contact with the corresponding pinion gears 32, 33, arranged on the common shaft 34. This shaft 34 rests in bearings 35, 36, fastened to the cross bar 9. This shaft is driven over a reduction gear 37 by a motor 38 the speed of which is adjusted according to the rotations of the tube 1.

For the separation of the tube portion 28 a cutting device of known type can be used comprising a slide rest (carriage) 39 running on one or two cross bars 9 with the possibility of locking it. It carries a motor 40 driving over a reduction gear the cutting tool represented for example by an autogenous cutting device, or roller shears 41, or a disk type milling cutter, or a circular saw. Furthermore, to this slide rest can be attached the tools required for the machining of the welding edge which can be driven by the same motor.

The arrangement described ensures the fixed position of the tube portion 28 in relation to the tube 1, even after the cutting operation. Only after this has been finished the holding devices 22, 23 can be raised whereupon the tube portion 28 rests free on the roller table for being taken off. After the tube 1 has been moved forward far enough the cutting-off machine 2 can be moved parallel to the axis for adjusting it for the cutting cycle following next in the described manner.

In its horizontal transverse direction the cutting device is unchangeably aligned and adjusted in relation to the tube axis whilst in its vertical direction it can be adjusted by means of an auxiliary device in a corresponding manner. According to the drawing the frame 2 is supported on the carriage 3 by means of doublearmed levers 42. The upper ends of the levers 42 are pivotally connected with the frame 2 by means of bolts 43 whilst the middle eyes are connected by means of bolts 44 with the sliding shoe which is movably arranged on the carriage 3. The lower ends are bifurcated and embrace, pivotally arranged in the same manner, the screw nuts 45 having thread in opposite directions. In these screw nuts 45 is arranged the spindle 46 having thread in opposite directions which can be actuated either by means of a socket pin or driven by a motor. As on each side of the carriage 3 such a lifting device must be operated it follows from the drawing that each of the spindles is equipped with a worm wheel 48 which are driven simultaneously by a worm 47. The worm gear is self-locking, for that reason a special safety device is not necessary.

Instead of the lifting device there can be arranged screw spindles or any hydraulic devices 49 to change the level of the rails 5 of the carriage 3 in relation to the base plate 50. It is clear that in such cases the rails must be connected as a frame and conducted in vertical direction.

What is claimed is:

1. Apparatus for transverse cutting off of a longitudinally advancing tube comprising:
    (A) a frame encircling the path of such tube and being axially advanceable therewith;
    (B) a plurality of tube engaging claws encircling the path of such tube, pairs of said claws rigidly connected to each other so as ato cradle a longitudinal portion of such tube;
    (C) a pair of motor driven circular plates supported in roller bearings rotatably supported in said frame, together with hydraulic means interposed between said circular plates and said tube engaging claws;
    (D) a cutting device with cutting member supported in said frame so that its cutting member engages such tube between said pairs of tube engaging claws;
    (E) articulated knees vertically adjusting said frame with respect to a base upon which it is supported, so as to maintain leveling of said frame and such tube, while adjusting the height of said cutting device.

2. Apparatus for transverse cutting off of a longitudinally advancing tube as in claim 1,
    said articulated knees being pivoted to said frame at one end and at their other end being pivoted to a sliding shoe engaging a threaded bolt adjusting mechanism supported upon said base.

3. An apparatus for transverse cutting off of a longitudinally advancing tube, as in claim 2, said frame being supported upon a wheeled shoe advanceable longitudinally upon rails whose level may be adjusted vertically.

References Cited by the Examiner

UNITED STATES PATENTS

| | | | |
|---|---|---|---|
| 3,029,674 | 4/1962 | Southwell | 82—53.1 X |
| 3,043,576 | 7/1962 | Diener | 82—53.1 X |
| 3,211,059 | 10/1965 | Linsinger | 82—53.1 X |

FOREIGN PATENTS 116,430    7/1961    Russia.

ANDREW R. JUHASZ, *Primary Examiner.*

HARRISON L. HINSON, *Examiner.*